(12) United States Patent
Yasui

(10) Patent No.: US 10,618,261 B2
(45) Date of Patent: *Apr. 14, 2020

(54) TISSUE PAPER

(71) Applicant: DAIO PAPER CORPORATION, Shikokuchuo-shi, Ehime (JP)

(72) Inventor: Shuta Yasui, Fujinomiya (JP)

(73) Assignee: Daio Paper Corporation, Ehime (JP)

( * ) Notice: Subject to any disclaimer, the term of this patent is extended or adjusted under 35 U.S.C. 154(b) by 87 days.

This patent is subject to a terminal disclaimer.

(21) Appl. No.: 15/763,392

(22) PCT Filed: Aug. 4, 2016

(86) PCT No.: PCT/JP2016/072948
§ 371 (c)(1),
(2) Date: Mar. 26, 2018

(87) PCT Pub. No.: WO2017/056712
PCT Pub. Date: Apr. 6, 2017

(65) Prior Publication Data
US 2018/0272680 A1 Sep. 27, 2018

(30) Foreign Application Priority Data

Sep. 28, 2015 (JP) ................... 2015-190406

(51) Int. Cl.
*B32B 29/06* (2006.01)
*B32B 29/00* (2006.01)
(Continued)

(52) U.S. Cl.
CPC .............. *B32B 29/005* (2013.01); *A47K 7/03* (2013.01); *A47K 10/16* (2013.01); *B32B 29/06* (2013.01);
(Continued)

(58) Field of Classification Search
CPC ...... A47K 10/16; A47K 7/03; B32B 2255/12; B32B 2255/24; B32B 2307/54;
(Continued)

(56) References Cited

U.S. PATENT DOCUMENTS 8,795,717 B2   8/2014   Moen et al.
9,181,465 B2   11/2015   Seidling et al.
(Continued)

FOREIGN PATENT DOCUMENTS

EP   3278695 A1   2/2018
EP   3279396 A1   2/2018
(Continued)

OTHER PUBLICATIONS

Supplemental European Search Report and Written Opinion dated May 17, 2019 for corresponding EP 16850889.

*Primary Examiner* — Lawrence D Ferguson
(74) *Attorney, Agent, or Firm* — Renner, Kenner; Arthur M. Reginelli

(57) ABSTRACT

[Problem] To provide tissue paper excellent in "moistness" and "smoothness". [Solution] The problem can be solved by tissue paper being two-ply tissue paper, in which a basis weight per one ply is greater than 12.9 g/m² and less than 16.8 g/m², a paper thickness in the two-ply state is not less than 128 μm nor more than 150 μm, and a chemical agent containing glycerin and 1,3-propanediol in a total amount of 83.7 mass % or more and having a mass ratio between glycerin and 1,3-propanediol of greater than 1:0.14 and less than 1:6.64, is contained in an amount of greater than 2.3 g/m² and less than 6.1 g/m².

4 Claims, 2 Drawing Sheets

(51) Int. Cl.
*A47K 10/16* (2006.01)
*D21H 21/22* (2006.01)
*D21H 19/12* (2006.01)
*D21H 27/00* (2006.01)
*A47K 7/03* (2006.01)

(52) U.S. Cl.
CPC ............. *D21H 19/12* (2013.01); *D21H 21/22* (2013.01); *D21H 27/00* (2013.01); *B32B 2255/12* (2013.01); *B32B 2255/24* (2013.01); *B32B 2307/54* (2013.01); *B32B 2307/718* (2013.01)

(58) Field of Classification Search
CPC . B32B 2307/718; B32B 29/005; B32B 29/06; D21H 19/12; D21H 21/22; D21H 27/00
See application file for complete search history.

(56) References Cited

U.S. PATENT DOCUMENTS

| | | | |
|---|---|---|---|
| 2011/0123584 A1* | 5/2011 | Seidling | A61K 8/0208 424/402 |
| 2018/0023255 A1 | 1/2018 | Yasui | |
| 2018/0030656 A1 | 2/2018 | Yasui | |

FOREIGN PATENT DOCUMENTS

| | | |
|---|---|---|
| JP | H 02-74694 A | 3/1990 |
| JP | 2013-511509 A | 4/2013 |
| JP | 2013-511626 A | 4/2013 |
| JP | 2013-227707 A | 11/2013 |
| JP | 5912196 B1 | 4/2016 |
| JP | 5956636 B1 | 7/2016 |

* cited by examiner

TISSUE PAPER

This application is a National-Stage application of PCT/JP2016/072948 filed on Aug. 4, 2016, which claims the benefit of Japanese Patent Application No. JP2015-190406 filed on Sep. 28, 2015, which are incorporated herein by reference.

TECHNICAL FIELD

The present invention relates to tissue paper, and particularly relates to tissue paper containing a moisturizing agent.

BACKGROUND ART

Tissue paper can be classified broadly into moisturizing tissue called as lotion tissue, a chemical solution-applied type, or the like in which a moisturizing agent is contained in tissue base paper obtained through paper making, and non-moisturizing tissue called as a multipurpose type, a general type, or the like containing no moisturizing agent.

The moisturizing tissue is mainly used for nose blowing, removal of make-up, and the like, in which it directly touches skin, and thus it is particularly demanded to have a satisfactory texture during use.

Incidentally, as quality characteristics of tissue paper, there can be mainly cited "softness", "smoothness", "moistness", "stickiness", "sensation of thickness", and "toughness (strength, secure feeling)".

In particular, the moisturizing tissue is superior to the non-moisturizing tissue in terms of "softness", "smoothness", and "moistness" because of an effect of the moisturizing agent, but, there exists no conventional moisturizing tissue which satisfies, in particular, both of "smoothness" and "moistness" at a high level. Besides, although further improvement in the texture is demanded by a user, it is extremely difficult to improve both of these "smoothness" and "moistness".

Specifically, the conventional moisturizing tissue is one in which a water-retaining property in paper is increased due to a moisture absorption operation of the moisturizing agent to improve the "softness" and the "moistness", and in accordance with that, the sensation of "smoothness" is also provided. However, when increase in a content of the conventional moisturizing agent or the like is performed, the "moistness" is enhanced, but, the "stickiness" is also enhanced at the same time, and in accordance with that, the "smoothness" on a surface is reduced and it becomes difficult to be sensed. Further, an excessive content of the moisturizing agent causes reduction in stiffness of paper, and the reduction in the stiffness of paper also becomes a cause of making it difficult to provide the sensation of "smoothness". Besides, a strength characteristic which is physically required for use such as the "toughness" is impaired, which also reduces the sensation of thickness and a paper thickness.

Further, the conventional moisturizing tissue paper is coated with, as a moisturizing agent, polyhydric alcohol or sugars such as glycerin or sorbitol as a main effective component, and in the conventional chemical solution, even if improvement is performed to a degree at which a concentration and a coating amount thereof are adjusted, it has not been possible to perform quality improvement in which both of the "moistness" and the "smoothness" are improved and besides, the "toughness" and the "sensation of thickness" are not impaired.

PRIOR ART DOCUMENTS

Patent Documents

Patent Document 1: Japanese Unexamined Patent Application Publication (Translation of PCT Application) No. 2013-511509
Patent Document 2: Japanese Unexamined Patent Application Publication (Translation of PCT Application) No. 2013-511626
Patent Document 3: Japanese Laid-open Patent Publication No. H2-74694

SUMMARY OF THE INVENTION

Problems to be Solved by the Invention

Accordingly, a main object of the present invention is to provide moisturizing tissue improving both of "moistness" and "smoothness" thereof in particular, capable of providing significant sensation of the "smoothness" while having the "moistness" which is not realized by the conventional moisturizing tissue, and further having excellent "toughness" and "sensation of thickness".

Means for Solving the Problems

Means for solving the above-described problems and operations and effects thereof are as follows.
[Invention described in claim 1]
Tissue paper being two-ply tissue paper, wherein:
a basis weight per one ply is greater than 12.9 g/m$^2$ and less than 16.8 g/m$^2$;
a paper thickness in the two-ply state is not less than 128 μm nor more than 150 μm; and
a chemical agent containing glycerin and 1,3-propanediol in a total amount of 83.7 mass % or more and having a mass ratio between glycerin and 1,3-propanediol of greater than 1:0.14 and less than 1:6.64, is contained in an amount of greater than 2.3 g/m$^2$ and less than 6.1 g/m$^2$.
[Invention described in claim 2]
Tissue paper being two-ply tissue paper, wherein:
a basis weight per one ply is not less than 13.5 g/m$^2$ nor more than 16.1 g/m$^2$;
a paper thickness in the two-ply state is not less than 128 μm nor more than 150 μm; and
a chemical agent containing glycerin and 1,3-propanediol in a total amount of 83.7 mass % or more and having a mass ratio between glycerin and 1,3-propanediol of greater than 1:0.14 and less than 1:6.64, is contained in an amount of greater than 2.3 g/m$^2$ and less than 6.1 g/m$^2$.
[Invention described in claim 3]
The tissue paper according to claim 1 or 2, wherein:
a dry tensile strength in a cross direction (CD) in the two-ply state is greater than 63 cN/25 mm and equal to or less than 133 cN/25 mm;
a wet tensile strength in the CD in the two-ply state is greater than 39 cN/25 mm and equal to or less than 59 cN/25 mm; and
a ratio of the wet tensile strength in the CD in the two-ply state to the dry tensile strength in the CD in the two-ply state is 0.30 or more.

Effect of the Invention

In order to realize both of "moistness" and "smoothness" in moisturizing tissue, the present inventors conducted studies regarding selections and compounding ratios of various chemical agents and paper physical properties, and as a result of this, they completed tissue paper according to the present invention.

When, in accordance with the present invention, a chemical agent containing, in particular, glycerin and 1,3-propanediol in a total amount of 83.7 mass % or more and having a mass ratio between glycerin and 1,3-propanediol (a mass ratio of 1,3-propanediol to glycerin whose mass is set to 1) of greater than 1:0.14 and less than 1:6.64, is contained, in an amount of greater than 2.3 g/m$^2$ and less than 6.1 g/m$^2$, in two-ply tissue paper in which a basis weight per one ply is greater than 12.9 g/m$^2$ and less than 16.8 g/m$^2$, preferably not less than 13.5 g/m$^2$ nor more than 16.1 g/m$^2$, and a paper thickness in the two-ply state is set to not less than 128 μm nor more than 150 μm, both of the "moistness" and the "smoothness" are realized at an extremely high level, when compared to conventional moisturizing tissue. Such an effect will be explained particularly in Examples to be described below.

Further, in this case, it is desirable that a dry tensile strength in a CD in the two-ply state is greater than 63 cN/25 mm and equal to or less than 133 cN/25 mm, a wet tensile strength in the CD in the two-ply state is greater than 39 cN/25 mm and equal to or less than 59 cN/25 mm, and a ratio of the wet tensile strength in the CD in the two-ply state to the dry tensile strength in the CD in the two-ply state is 0.30 or more. By setting such a range of the dry tensile strength, strength for enduring the use is secured, and at the same time, reduction in the wet strength by containing the chemical agent is suppressed, which makes it possible to secure strength even in a case where the tissue paper is used with wet hands, and the like.

MODES FOR CARRYING OUT THE INVENTION

Figure 1:
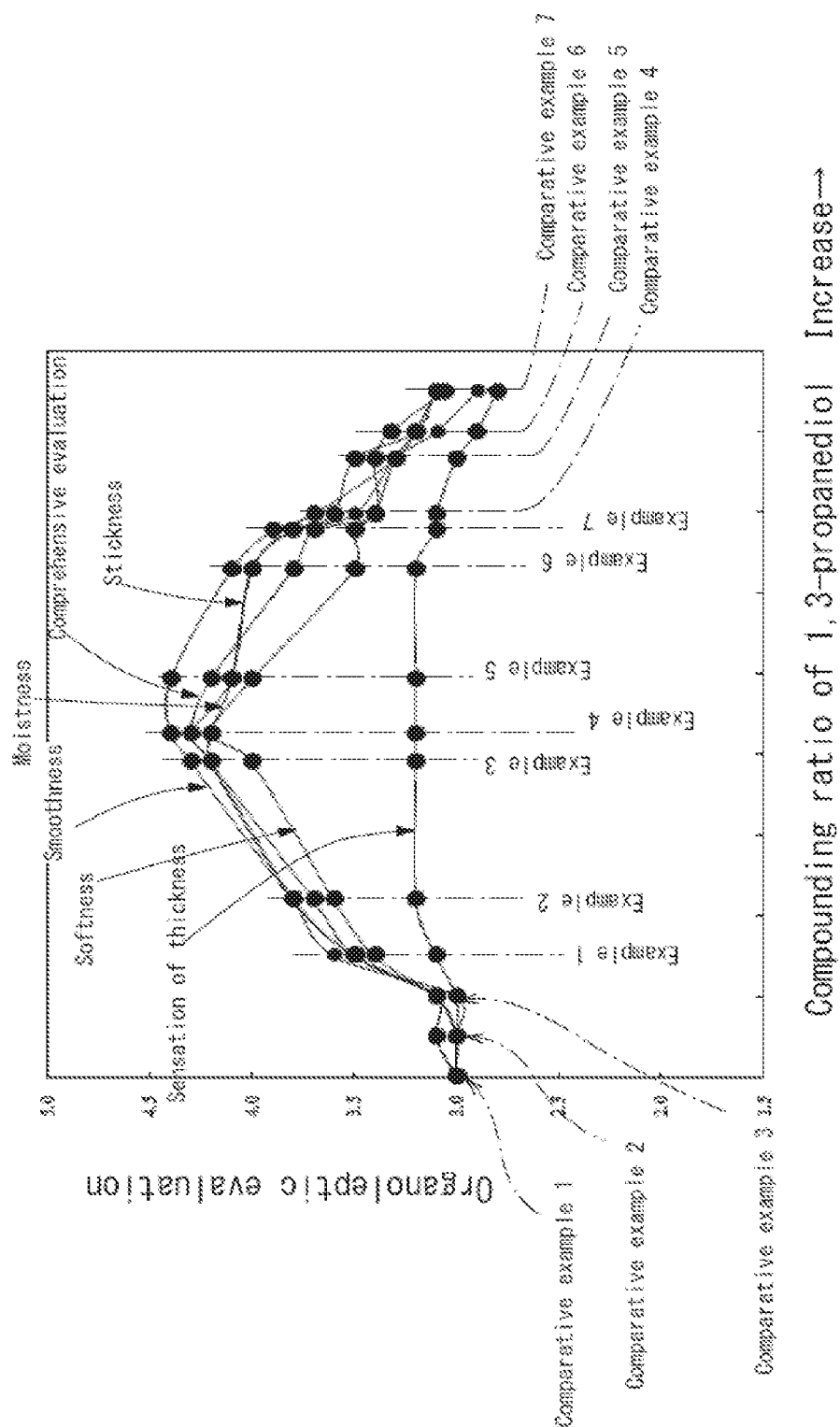
FIG. 1 is a graph illustrating results of test examples according to an embodiment.

Hereinafter, an embodiment of the present invention will be described. Tissue paper according to the present embodiment is two-ply tissue paper in which a basis weight per one ply is greater than 12.9 g/m$^2$ and less than 16.8 g/m$^2$, preferably not less than 13.5 g/m$^2$ nor more than 16.1 g/m$^2$, and a paper thickness in the two-ply state is not less than 128 μm nor more than 150 μm.

This tissue paper has a relatively moderate basis weight and a relatively moderate paper thickness among various types of tissue paper. Up to now, tissue paper has been classified broadly into a high-quality type with a high basis weight and a large paper thickness, and a multipurpose type with a low basis weight and a small paper thickness. In recent years, a demand for tissue paper having a basis weight and a thickness which are in the middle of those of high-quality type and those of multipurpose type has been increasing, and in this type of tissue paper, one which is inexpensive but has softness and smoothness which are not inferior to those of high-quality type has been particularly demanded. In the present invention, the "moistness" and the "smoothness" can be sensed particularly in such tissue paper with a moderate basis weight and a moderate thickness, in combination with a peculiar moisturizing agent and an application amount of the moisturizing agent to be described later, in particular. Note that the basis weight is set to a value measured based on JIS P 8124 (1998). In a measuring method of the paper thickness, it is set that a test piece is sufficiently humidified under the condition of JIS P 8111 (1998), and then the paper thickness in a two-ply state is measured by using a dial thickness gauge (a thickness measurement unit) "PEACOCK G type" (manufactured by OZAKI MFG. CO., LTD.) under the same condition. Concretely, a plunger is lowered onto a measurement table after making sure that there is no foreign matter, dust, or the like between the plunger and the measurement table, a scale of the aforementioned dial thickness gauge is moved to a zero point, the plunger is then raised to put a sample on a test table, the plunger is slowly lowered, and the gauge at that time is read. At this time, the plunger is just put on the sample. A terminal of the plunger is made of metal, and is disposed so that a circular plane with a diameter of 10 mm is perpendicular to a paper plane, and a load at the time of measuring the paper thickness is about 70 gf. Note that the paper thickness is set to an average value obtained by performing the measurement ten times.

On one hand, the tissue paper according to the present embodiment contains a chemical agent containing glycerin and 1,3-propanediol in a total amount of 83.7 mass % or more and having a mass ratio between glycerin and 1,3-propanediol (a mass ratio of 1,3-propanediol to glycerin whose mass is set to 1) of greater than 1:0.14 and less than 1:6.64, in an amount of greater than 2.3 g/m$^2$ and less than 6.1 g/m$^2$. When the amount of glycerin and 1,3-propanediol in total is less than 83.7 mass %, both of the "moistness" and the "smoothness" are not sufficiently improved. In addition, when the mass ratio between glycerin and 1,3-propanediol is out of the range of greater than 1:0.14 and less than 1:6.61, it becomes difficult to provide the sensation of both or either of the "moistness" and the "smoothness". Further, when the content of the moisturizing agent is 2.3 g/m$^2$ or less, both of the "moistness" and the "smoothness" cannot be sensed, and further, when it is 6.1 g/m$^2$ or more, a cost becomes high, and at the same time, not only the "smoothness" but also the "moistness" becomes difficult to be sensed.

On the other hand, a fiber material constituting the tissue paper according to the present embodiment is also pulp fiber, and is desirably formed of NBKP and LBKP used for tissue paper. Although recycled pulp may also be mixed, the tissue paper is preferably constituted only of NBKP and LBKP of virgin pulp. As a mixing ratio, NBKP:LBKP=25:75 to 40:60 by mass ratio is desirable. When the mixing ratio falls within this range, the paper strength and the "softness" are easily exhibited.

Meanwhile, in the tissue paper according to the present embodiment, it is desirable that a dry tensile strength in a CD in the two-ply state is greater than 63 cN/25 mm and equal to or less than 133 cN/25 mm, a wet tensile strength in the CD in the two-ply state is greater than 39 cN/25 mm and equal to or less than 59 cN/25 mm, and a ratio of the wet tensile strength in the CD in the two-ply state to the dry tensile strength in the CD in the two-ply state is 0.30 or more. The dry tensile strength is defined by JIS P 8113, and the wet tensile strength is defined by JIS P 8135 (1998). By making this tissue paper have the above-described respective strengths, the tissue paper can exhibit sufficient strength for enduring the use, and further, it makes a user feel "toughness (strength, secure feeling)". Besides, the tissue paper according to the present embodiment has the ratio of the wet tensile strength in the CD in the two-ply state to the dry tensile strength in the CD in the two-ply state of 0.30 or more, and thus a strength difference between a dry state and a wet state is relatively small, when compared to general moisturizing tissue. This can be easily achieved by setting the basis weight and the like and the characteristic moisturizing agent constitution related to the tissue paper according to the present embodiment, and further, by providing such a strength difference, a user feels "toughness (strength, secure feeling) in a use mode in which the tissue paper changes from a dry state to a wet state, particularly when the user blows his/her nose, and the like. Besides, a change in strength of the paper in such a use mode becomes difficult to be sensed, and the user does not sense an unpleasant sensation such that the "smoothness" changes at the time of use.

When adjusting the dry tensile strength and the wet tensile strength to the above-described values in order to realize the moisturizing agent constitution according to the tissue paper of the present embodiment, it is possible to internally add a dry paper strengthening agent or a wet paper strengthening agent to a paper material or a wet paper. As the dry paper strengthening agent, it is possible to use starch, polyacrylamide, CMC (carboxymethyl cellulose) or the salt thereof, carboxymethyl cellulose sodium, carboxymethyl cellulose calcium, carboxymethyl cellulose zinc, or the like. As the wet paper strengthening agent, it is possible to use a polyamide polyamine epichlorohydrin resin, a urea resin, an acid colloid-melamine resin, thermal cross-linking coating PAM, or the like. Note that when the dry paper strengthening agent is internally added, an addition amount thereof is about 0.5 to 1.0 kg/t by mass ratio relative to a pulp slurry. Further, the wet paper strengthening agent is desirably a cationic one, and an addition amount thereof is about 5.0 to 20.0 kg/pulp t by mass ratio relative to a pulp slurry.

The tissue paper according to the present embodiment can be manufactured by a method similar to a manufacturing method of conventional moisturizing tissue. Specifically, a single-layer tissue base paper, which has crepe and which is made by a paper making machine, is wound to form a primary paper roll, two of the primary paper rolls are set in a multi-ply forming machine which is also called as a ply machine, a single-layer continuous sheet is reeled out from each of the primary paper rolls to be multi-ply formed, and then appropriately subjected to slitting or the like to be wound as a secondary paper roll. Subsequently, by using the secondary paper roll, a multi-ply formed bundle is formed in a folding machine which is also called as an interfolder, or the like, the bundle is subjected to cutting in an appropriate size, or the like, to thereby make the tissue paper into product. Subsequently, by separately providing a chemical solution apply step in any step of the series of manufacturing steps for making product or between the manufacturing steps to apply a moisturizing chemical solution containing a moisturizing agent to the tissue paper, it is possible to manufacture the tissue paper according to the present embodiment.

The moisturizing chemical solution according to the present embodiment may be adjusted so that it contains glycerin and 1,3-propanediol in a total amount of 83.7 mass % or more in active ingredients, and has a mass ratio between glycerin and 1,3-propanediol of greater than 1:0.14 and less than 1:6.64. Concretely, the moisturizing chemical solution is adjusted to have viscosity in accordance with a coating method, by appropriately using a solvent such as water while setting the aforementioned active ingredients as bases. The moisturizing chemical solution can contain, other than the above, publicly-known auxiliary agents in a range not preventing the effect of glycerin and 1,3-propanediol. It is of course possible that these auxiliary agents in the moisturizing chemical solution are contained in the tissue paper after being coated, thereby constituting the chemical agent. As examples of the auxiliary agent, there can be cited a moisturizing auxiliary component such as sorbitol, a hydrophilic polymer gelling agent such as glucomannan for increasing a water-retaining property in the tissue paper, a flexibility improving agent such as a surfactant or phosphoric ester, an oily component such as liquid paraffin which helps the exhibition of smoothness, and other than the above, an emulsifying agent, an antiseptic agent, an antifoaming agent, and the like for improving stability and coating property of the moisturizing agent. These auxiliary agents can be contained in an amount of up to less than 16.3 mass % in total as an active ingredient (absolutely dried).

On the other hand, the moisturizing chemical solution is externally applied to the tissue base paper by using a roll transfer device such as a flexographic printing machine or a gravure printing machine, or a publicly-known chemical solution coating machine such as a spray coating device. Note that although the moisturizing chemical solution may be applied to the tissue base paper from one direction, it is desirable that the moisturizing chemical solution is coated on both surfaces of the tissue base paper because it becomes easy to uniformize the smoothness of the both surfaces. Further, an application amount of the moisturizing chemical solution with respect to the tissue base paper is appropriately adjusted by considering evaporation of water being the solvent during the manufacturing process and stretching of the tissue base paper that occurs during the manufacturing process. Regarding the stretching, since the tissue base paper is crepe paper having crepe, when the moisturizing chemical solution is applied to the tissue base paper, and a winding step and a folding step are then performed after the application of the moisturizing chemical solution, there is a tendency that the tissue base paper is stretched and the application amount is slightly reduced. Therefore, it is desirable that the application amount of the active ingredients is adjusted to be slightly larger than the desired application amount, by taking such stretching during the manufacturing step into consideration.

Next, explanation will be further made particularly on effects of the tissue paper according to the present embodiment described above in "Examples".

EXAMPLES

Test samples relating to the tissue paper according to the present invention and tissue paper different from the tissue paper of the present invention were produced, and study was conducted by performing the following organoleptic test in which "softness", "smoothness", "moistness", and "stickiness" were set as evaluation items. Physical property values and composition values of the respective samples were measured in the following manner. The physical property values and the composition values of the respective samples and test results are as presented in the following Tables 1 and 2.

[Basis weight]

The basis weight was measured in accordance with JIS P 8124 (1998). Each value in Tables is an average value of respective plies.

[Paper thickness]

The paper thickness was measured in accordance with the measuring method of the thickness described above by using the dial thickness gauge (the thickness measurement unit)

"PEACOCK G type" (manufactured by OZAKI MFG. CO., LTD.) under the condition of JIS P 8111 (1998).

[Density]

The density is a value obtained by dividing a value (C) in which a basis weight of tissue paper humidified under the condition of JIS P 8111 (1998) is doubled, by a paper thickness (D) of the aforementioned tissue paper (in a two-ply state), and the value is expressed by two decimal places with a unit of g/cm$^3$.

[Dry tensile strength]

The dry tensile strength was measured in accordance with a tensile test of JIS P 8113 (1998).

[Wet tensile strength]

The wet tensile strength was measured in accordance with a tensile test of JIS P 8135 (1998).

[Elongation percentage]

The elongation percentage was measured in accordance with the tensile test of JIS P 8113 (1998) by using a "tensile and compression testing machine TG-200N" manufactured by Minebea Co., Ltd.

[Softness]

The softness was measured in accordance with the Handle-O-Meter method based on the JIS L 1096 E method. Note that the measurement was conducted by setting a size of a test piece to 100 mm×100 mm, and a clearance to 5 mm. The one-ply test piece was measured five times in each of a longitudinal direction and a lateral direction, and an average value of ten times of the measurement in total was expressed with a unit of cN/100 mm.

[MMD]

The MMD is an average deviation of a static friction coefficient, and is one of indices of smoothness. It is considered that the smaller the numeric value of the MMD, the larger the smoothness, while the larger the numeric value of the MMD, the smaller the smoothness. A measuring method of the MMD is carried out in a manner that a contact surface of a friction member is made to contact a surface of a measurement sample to which tension is applied by 20 g/cm in a predetermined direction at a contact pressure of 25 g, moved by 2 cm at a speed of 0.1 cm/s in substantially the same direction as the direction in which the tension is applied, and a friction coefficient at this time is measured by using a friction tester KES-SE (manufactured by Kato Tech Co., Ltd.). A value obtained by dividing the friction coefficient by a friction distance (movement distance=2 cm) corresponds to the MMD. Note that the friction member is formed by disposing 20 piano wires P each having a diameter of 0.5 mm in an adjacent manner, and has the contact surface formed to have a length and a width each of which is 10 mm. It is set that a unit swelling portion whose front end is formed of 20 piano wires P (with a radius of curvature of 0.25 mm) is formed on the contact surface.

[Moisture percentage of product]

A sample was humidified under the condition of JIS P 8111 (1998), and then measurement was performed based on JIS P 8127 (1998).

[Chemical agent content ratio and chemical agent content]

The chemical agent content ratio and the chemical agent content can be calculated through sample measurements of the following (1) to (4) and calculation, and values in Tables are values based on the sample measurements. Note that the chemical agent content ratio and the chemical agent content may also be calculated based on the composition of the moisturizing chemical solution and physical properties of the base paper.

(1) Measurement of basis weight of sample

Tissue paper is humidified under a 50% R. H. environment at 23° C. defined in JIS P 8111 (1998). A vertical size and a lateral size of each of five sets of tissue paper is measured to calculate an area of the tissue paper (note that the area is an area when a plied sheet is seen from a visual point on a line perpendicular to a plane of the plied sheet, and does not indicate a total area of the respective plied sheets and front and rear surfaces thereof). Next, the sample is put into a weighing bottle, and dried for 120 minutes under a drying condition at a temperature of 80° C. The weighing bottle is capped and placed in a desiccator for heat dissipation, and an absolute dry mass of one set (two sheets) of tissue paper is determined. From the absolute dry mass and the previously measured area, an absolute dry basis weight (per one sheet) of each of the five sets is calculated, and an is average value of the absolute dry basis weights is set to an absolute dry basis weight (g/m$^2$) of the sample.

(2) Chemical agent adhesion percentage

About 10 g of a sample is put into a tubular weighing bottle, dried for 120 minutes at 80° C. to be absolutely dried, and after that, the weighing bottle is capped and placed in a desiccator for heat dissipation, and an absolute dry mass of the sample is determined. A cylindrical filter paper filled with the sample is put into a Soxhlet extractor, an acetone: ethyl alcohol mixed solvent (with a mixing volume ratio of 1:1) of 120 to 140 mL is put into a flat-bottomed flask, and heating is performed on a hot water bath for 4 hours to a degree at which an extracted liquid keeps boiling lightly. After the heating, the extracted liquid is collected in a flask. A bent column for fractionation and a cooler are set in a flask, and heating is performed on a hot water bath to remove the solvent. Further, the flask is let stand for 90 minutes in a constant temperature dryer at a temperature of 105±2° C., to thereby completely remove the solvent. A mass of the flask, which is a constant mass, is subtracted from the mass of flask after the removal of the solvent, to thereby determine a mass (B) (g) of an extract. Next, the chemical agent adhesion percentage is determined by the following expression.

Chemical agent adhesion percentage=[(mass of extract)/{(absolute dry mass of sample)−(mass of extract)}]×100

Note that the amounts and the mass ratio of glycerin and 1,3-propanediol contained in the extract can be measured by a gas chromatography-mass spectrometer (GC-MS), high-performance liquid chromatography (HPLC), or the like.

(3) Calculation of chemical agent content

The chemical agent content is calculated through the following expression.

Chemical agent content (g/m$^2$)=(absolute dry basis weight calculated in aforementioned (1))×(number of plies)×(chemical agent adhesion percentage calculated in aforementioned (2))÷[100+ (chemical agent adhesion percentage calculated in aforementioned (2))]

(4) [Chemical agent content ratio (absolutely DRIED)]

The chemical agent content ratio (absolutely dried) is calculated through the following expression from a mass (A) (g) of tissue paper which is humidified under the condition of JIS P 8111, and the mass (B) (g) of the extract determined in the aforementioned (2). Chemical agent content ratio (mass %)=(B)÷(A)×100 (mass %)

Note that the chemical agent content ratio can also be calculated from the mass (A) (g) of the tissue paper, and a solid content percentage as a result of removing moisture in the chemical solution.

[Organoleptic test]

Evaluation was performed by thirty evaluators on respective organoleptic properties of "softness", "smoothness", "moistness", and "stickiness", regarding each sample based on comparison with a reference sample, in which when the evaluator felt that each organoleptic property was "very excellent", it was evaluated as "5", when the evaluator felt that each organoleptic property was "excellent", it was evaluated as "4", when the evaluator felt that each organoleptic property was "equal to the reference", it was evaluated as "3", when the evaluator felt that each organoleptic property was "poor", it was evaluated as "2", and when the evaluator felt that each organoleptic property was "significantly poor", it was evaluated as "1", and an average score of the respective evaluators was calculated to be set as the evaluation value. Note that regarding "comprehensive evaluation", when the evaluator felt that "the texture is good, and intention for purchase is very high", it was evaluated as "5", when the evaluator felt that "the texture is good, and intention for purchase is high", it was evaluated as "4", when the evaluator felt that "the texture is normal, and it cannot be said that intention for purchase is high or low", it was evaluated as "3", when the evaluator felt that "the texture is poor, and intention for purchase is low", it was evaluated as "2", and when the evaluator felt that "the texture is very poor, and there is no intention for purchase almost at all", it was evaluated as "1", and an average score of the respective evaluators was calculated to be set as the evaluation value.

[Test results]

TABLE 1

| | | | COMPARATIVE EXAMPLE 1 | COMPARATIVE EXAMPLE 2 | COMPARATIVE EXAMPLE 3 | EXAMPLE 1 | EXAMPLE 2 | EXAMPLE 3 | EXAMPLE 4 |
|---|---|---|---|---|---|---|---|---|---|
| PAPER MAKING OF BASE PAPER | MIXING RATIO OF PULP | NBKP:LBKP | 30:70 | 30:70 | 30:70 | 30:70 | 30:70 | 30:70 | 30:70 |
| | CREPE RATIO | % | 21.0 | 21.0 | 21.0 | 21.0 | 21.0 | 21.0 | 21.0 |
| | SOFTENING AGENT | kg/t | 0.6 | 0.6 | 0.6 | 0.6 | 0.6 | 0.6 | 0.6 |
| | DRY PAPER STRENGTHENING AGENT | kg/t | 0.0 | 0.0 | 0.0 | 0.0 | 0.0 | 0.0 | 0.0 |
| | WET PAPER STRENGTHENING AGENT | kg/t | 1.2 | 1.2 | 1.2 | 1.2 | 1.2 | 1.2 | 1.2 |
| COATING OF CHEMICAL SOLUTION | COATING OF CHEMICAL SOLUTION | PRESENCE/ABSENCE | PRESENCE | PRESENCE | PRESENCE | PRESENCE | PRESENCE | PRESENCE | PRESENCE |
| | COATING METHOD | | FLEXOGRAPHIC TRANSFER | GRAVURE TRANSFER | FLEXOGRAPHIC TRANSFER | FLEXOGRAPHIC TRANSFER | GRAVURE TRANSFER | FLEXOGRAPHIC TRANSFER | FLEXOGRAPHIC TRANSFER |
| MOISTURIZING AGENT COMPONENT | MOISTURIZING COMPONENT GLYCERIN | MASS % | 84.9 | 79.9 | 72.9 | 62.9 | 52.9 | 45.9 | 42.5 |
| | 1,3-PROPANEDIOL | MASS % | 0.0 | 5.0 | 10.0 | 15.0 | 22.0 | 39.0 | 42.5 |
| | SORBITOL | MASS % | 0.0 | 0.0 | 4.0 | 7.0 | 10.0 | 0.0 | 0.0 |
| | SOFTENING AGENT PHOSPHORIC ESTER | MASS % | 1.3 | 1.3 | 1.3 | 1.3 | 1.3 | 1.3 | 1.3 |
| | OILY COMPONENT LIQUID PARAFFIN | MASS % | 2.3 | 2.3 | 2.3 | 2.3 | 2.3 | 2.3 | 2.3 |
| | HYDROPHILIC POLYMER GELLING AGENT (GLUCOMANNAN) | MASS % | 0.5 | 0.5 | 0.5 | 0.5 | 0.5 | 0.5 | 0.5 |
| | EMULSIFYING AGENT | MASS % | 0.3 | 0.3 | 0.3 | 0.3 | 0.3 | 0.3 | 0.3 |
| | ANTISEPTIC AGENT | MASS % | 0.1 | 0.1 | 0.1 | 0.1 | 0.1 | 0.1 | 0.1 |
| | ANTIFOAMING AGENT | MASS % | 0.05 | 0.05 | 0.05 | 0.05 | 0.05 | 0.05 | 0.05 |
| | WATER (MOISTURE AMOUNT IN CHEMICAL SOLUTION) | MASS % | 10.5 | 10.5 | 10.5 | 10.5 | 10.5 | 10.5 | 10.5 |
| | TOTAL AMOUNT | MASS % | 100.0 | 100.0 | 102.0 | 100.0 | 100.0 | 100.0 | 100.0 |
| | GLYCERIN + 1,3 PROPANEDIOL (IN CHEMICAL AGENT) | MASS % | 94.9 | 94.9 | 92.6 | 87.0 | 83.7 | 94.9 | 94.9 |
| | MASS RATIO | (GLYCERIN):(1,3 PROPANEDIOL) | — | 1:0.06 | 1:0.14 | 1:0.24 | 1:0.42 | 1:0.85 | 1:1 |
| CHEMICAL AGENT CONTENT (ABSOLUTELY DRIED) | CHEMICAL AGENT CONTENT (INCLUDING MOISTURE) | MASS % | 18.0 | 18.0 | 18.0 | 18.0 | 18.0 | 18.0 | 18.0 |
| | CHEMICAL AGENT CONTENT | g/m² | 3.9 | 4.0 | 3.8 | 3.9 | 3.9 | 4.0 | 4.0 |
| | CHEMICAL AGENT CONTENT RATIO (ABSOLUTELY DRIED) | MASS % | 16.1 | 16.1 | 16.1 | 16.1 | 16.1 | 16.1 | 16.1 |
| | 1,3-PROPANEDIOL PROPORTION IN PAPER | MASS % | 0.0 | 0.9 | 1.8 | 2.7 | 4.0 | 7.0 | 7.7 |
| PRODUCT QUALITY | BASIS WEIGHT (1P) | g/m² | 14.2 | 14.3 | 13.9 | 14.1 | 14.1 | 14.5 | 14.3 |
| | PAPER THICKNESS (2P) | μm | 152 | 127 | 146 | 134 | 132 | 135 | 136 |
| | DENSITY (2P) | g/cm³ | 0.19 | 0.22 | 0.19 | 0.21 | 0.21 | 0.21 | 0.21 |
| | DRY TENSILE STRENGTH (MD) 2P | cN/25 mm | 231 | 205 | 246 | 216 | 221 | 184 | 182 |
| | DRY TENSILE STRENGTH (CD) 2P | cN/25 mm | 80 | 91 | 86 | 90 | 85 | 83 | 79 |
| | WET TENSILE STRENGTH (MD) 2P | cN/25 mm | 118 | 105 | 125 | 110 | 113 | 81 | 77 |
| | WET TENSILE STRENGTH (CD) 2P | cN/25 mm | 29 | 43 | 43 | 46 | 46 | 48 | 44 |
| | WET TENSILE STRENGTH (LATERAL DIRECTION) 2P/DRY TENSILE STRENGTH (LATERAL DIRECTION) 2P | | 0.36 | 0.47 | 0.50 | 0.51 | 0.54 | 0.58 | 0.56 |

TABLE 1-continued

Table 1

| | | Example 5 | Example 6 | Example 7 | Comparative Example 4 | Comparative Example 5 | Comparative Example 6 | Comparative Example 7 |
|---|---|---|---|---|---|---|---|---|
| ORGANOLEPTIC EVALUATION | SOFTNESS MMD (FRONT SURFACE) cN/100 mm | 0.88 | 0.76 | 0.82 | 0.91 | 0.79 | 0.71 | 0.80 |
| | MOISTURE PERCENTAGE OF PRODUCT 1/100 | 6.3 | 7.0 | 6.8 | 6.7 | 7.0 | 6.8 | 7.0 |
| | % | 11.5 | 12.0 | 12.4 | 12.9 | 12.7 | 13.5 | 14.3 |
| | SOFTNESS | 3.0 | 3.0 | 3.1 | 3.4 | 3.6 | 4.0 | 4.2 |
| | SMOOTHNESS | 3.0 | 3.1 | 3.1 | 3.5 | 3.8 | 4.3 | 4.4 |
| | SENSATION OF THICKNESS | 3.0 | 3.0 | 3.0 | 3.1 | 3.2 | 3.2 | 3.2 |
| | MOISTNESS | 3.0 | 3.1 | 3.1 | 3.5 | 3.8 | 4.2 | 4.2 |
| | STICKINESS | 3.0 | 3.0 | 3.0 | 3.6 | 3.8 | 4.2 | 4.3 |
| | COMPREHENSIVE EVALUATION | 3.0 | 3.0 | 3.1 | 3.5 | 3.7 | 4.2 | 4.3 |
| PAPER MAKING OF BASE PAPER | MIXING RATIO OF PULP | 30:70 | 30:70 | 30:70 | 30:70 | 30:70 | 30:70 | 30:70 |
| | CREPE RATIO | 21.0 | 21.0 | 21.0 | 21.0 | 21.0 | 21.0 | 21.0 |
| | SOFTENING AGENT | 0.6 | 0.6 | 0.6 | 0.6 | 0.6 | 0.6 | 0.6 |
| | DRY PAPER STRENGTHENING AGENT | 0.0 | 0.0 | 0.0 | 0.0 | 0.0 | 0.0 | 0.0 |
| | WET PAPER STRENGTHENING AGENT | 1.2 | 1.2 | 1.2 | 1.2 | 1.2 | 1.2 | 1.2 |
| COATING OF CHEMICAL SOLUTION | COATING OF CHEMICAL SOLUTION | PRESENCE | PRESENCE | PRESENCE | PRESENCE | PRESENCE | PRESENCE | PRESENCE |
| | COATING METHOD | GRAVURE TRANSFER | FLEXOGRAPHIC TRANSFER | GRAVURE TRANSFER | GRAVURE TRANSFER | FLEXOGRAPHIC TRANSFER | GRAVURE TRANSFER | FLEXOGRAPHIC TRANSFER |
| MOISTURIZING AGENT COMPONENT | MOISTURIZING COMPONENT GLYCERIN | 28.7 | 17.0 | 12.5 | 10.5 | 8.4 | 5.0 | 0.0 |
| | 1,3-PROPANEDIOL | 49.3 | 62.9 | 67.7 | 69.7 | 76.5 | 79.9 | 84.9 |
| | SORBITOL | 6.9 | 5.0 | 4.7 | 4.7 | 0.0 | 0.0 | 0.0 |
| | SOFTENING AGENT PHOSPHORIC ESTER | 1.3 | 1.3 | 1.3 | 1.3 | 1.3 | 1.3 | 1.3 |
| | OILY COMPONENT LIQUID PARAFFIN | 2.3 | 2.3 | 2.3 | 2.3 | 2.3 | 2.3 | 2.3 |
| | HYDROPHILIC POLYMER GELLING AGENT (GLUCOMANNAN) | 0.5 | 0.5 | 0.5 | 0.5 | 0.5 | 0.5 | 0.5 |
| | EMULSIFYING AGENT | 0.3 | 0.3 | 0.3 | 0.3 | 0.3 | 0.3 | 0.3 |
| | ANTISEPTIC AGENT | 0.1 | 0.1 | 0.1 | 0.1 | 0.1 | 0.1 | 0.1 |
| | ANTIFOAMING AGENT | 0.05 | 0.05 | 0.05 | 0.05 | 0.05 | 0.05 | 0.05 |
| | WATER (MOISTURE AMOUNT IN CHEMICAL SOLUTION) | 10.5 | 10.5 | 10.5 | 10.5 | 10.5 | 10.5 | 10.5 |
| | TOTAL AMOUNT | 100.0 | 100.0 | 100.0 | 100.0 | 100.0 | 100.0 | 100.0 |
| | GLYCERIN + 1,3 PROPANEDIOL (IN CHEMICAL AGENT) | 87.2 | 89.3 | 89.6 | 89.6 | 94.9 | 94.9 | 94.9 |
| | MASS RATIO | 1:1.72 | 1:3.7 | 1:5.42 | 1:6.64 | 1:9.11 | 1:15.98 | — |
| CHEMICAL AGENT CONTENT | CHEMICAL AGENT CONTENT RATIO (INCLUDING MOISTURE) | 18.0 | 18.0 | 18.0 | 18.0 | 18.0 | 18.0 | 18.0 |
| | CHEMICAL AGENT CONTENT | 4.1 | 4.0 | 4.1 | 4.1 | 3.9 | 4.1 | 3.9 |
| | CHEMICAL AGENT CONTENT RATIO (ABSOLUTELY DRIED) | 16.1 | 16.1 | 16.1 | 16.1 | 16.1 | 16.1 | 16.1 |
| PRODUCT QUALITY | 1,3-PROPANEDIOL PROPORTION IN PAPER | 8.9 | 11.3 | 12.2 | 12.5 | 13.8 | 14.4 | 15.3 |
| | BASIS WEIGHT (1P) | 14.6 | 14.5 | 14.6 | 14.7 | 14.1 | 14.9 | 14.0 |
| | PAPER THICKNESS (2P) | 135 | 142 | 132 | 132 | 148 | 145 | 147 |
| | DENSITY (2P) | 0.22 | 0.20 | 0.22 | 0.22 | 0.19 | 0.21 | 0.19 |
| | DRY TENSILE STRENGTH (MD) 2P | 254 | 210 | 220 | 223 | 223 | 199 | 248 |

TABLE 1-continued

Table 1

| | | | | | | | |
|---|---|---|---|---|---|---|---|
| | DRY TENSILE STRENGTH (CD) 2P | 103 | 83 | 88 | 85 | 86 | 72 | 100 |
| | WET TENSILE STRENGTH (MD) 2P | 130 | 107 | 121 | 114 | 114 | 101 | 99 |
| | WET TENSILE STRENGTH (CD) 2P | 51 | 43 | 42 | 39 | 53 | 53 | 54 |
| | WET TENSILE STRENGTH (LATERAL DIRECTION) 2P/DRY TENSILE STRENGTH (LATERAL DIRECTION) 2P | 0.50 | 0.52 | 0.48 | 0.46 | 0.62 | 0.74 | 0.54 |
| | SOFTNESS | 0.79 | 0.84 | 0.74 | 0.76 | 0.94 | 0.77 | 0.90 |
| | MMD (FRONT SURFACE) | 7.8 | 7.3 | 7.6 | 7.8 | 6.8 | 6.2 | 6.7 |
| | MOISTURE PERCENTAGE OF PRODUCT | 14.7 | 14.7 | 14.4 | 14.4 | 14.7 | 14.8 | 14.4 |
| ORGANOLEPTIC EVALUATION | SOFTNESS | 4.0 | 3.5 | 3.5 | 3.4 | 3.3 | 3.2 | 3.1 |
| | SMOOTHNESS | 4.4 | 4.1 | 3.9 | 3.7 | 3.3 | 3.2 | 3.1 |
| | SENSATION OF THICKNESS | 3.2 | 3.2 | 3.1 | 3.1 | 3.0 | 2.9 | 2.8 |
| | MOISTNESS | 4.1 | 4.0 | 3.8 | 3.6 | 3.5 | 3.2 | 3.1 |
| | STICKINESS | 4.1 | 4.0 | 3.8 | 3.5 | 3.3 | 3.1 | 2.9 |
| | COMPREHENSIVE EVALUATION | 4.2 | 3.8 | 3.7 | 3.4 | 3.4 | 3.3 | 3.1 |

Table 1 presents results obtained by performing tests on respective samples in which paper making conditions of base paper, a coating amount of the chemical solution, and the like were set to be constant, and a compounding amount of 1,3-propanediol in the chemical agent was changed, and in relation to the compounding amount, a ratio between 1,3-propanediol and glycerin was changed. A reference sample for the organoleptic evaluation is one containing no 1,3-propanediol and containing glycerin as a main component (comparative example 1). Further, the results of the organoleptic evaluation are turned into a graph and presented in FIG. 1.

As illustrated in Table 1 and FIG. 1, when the mass ratio between glycerin and 1,3-propanediol is within the range of the present invention, the results which were significantly superior to those of the reference sample were obtained regarding the respective evaluation items of "softness", "smoothness", "moistness", "stickiness", and "comprehensive evaluation". From the above description, it can be recognized that when the mass ratio between glycerin and 1,3-propanediol is set to fall within the range of the present invention, "smoothness and moistness" are provided but "stickiness" is difficult to be sensed.

Further, from the above Table 1, it can also be confirmed that even if the content of the chemical agent is within the range of the present invention, the evaluation results are not good if the mass ratio between glycerin and 1,3-propanediol is out of the range of the present invention.

TABLE 2

Table 2

| | | | COMPARATIVE EXAMPLE 10 | COMPARATIVE EXAMPLE 11 | COMPARATIVE EXAMPLE 12 | EXAMPLE 8 | EXAMPLE 9 | EXAMPLE 10 | EXAMPLE 11 |
|---|---|---|---|---|---|---|---|---|---|
| PAPER MAKING OF BASE PAPER | MIXING RATIO OF PULP | NBKP:LBKP | 30:70 | 30:70 | 30:70 | 30:70 | 30:70 | 30:70 | 30:70 |
| | CREPE RATIO | % | 21.0 | 21.0 | 21.0 | 21.0 | 21.0 | 21.0 | 21.0 |
| | SOFTENING AGENT | MASS % | 0.6 | 0.6 | 0.6 | 0.6 | 0.6 | 0.6 | 0.6 |
| | DRY PAPER STRENGTHENING AGENT | MASS % | 0.0 | 0.0 | 0.0 | 0.0 | 0.0 | 0.0 | 0.0 |
| | WET PAPER STRENGTHENING AGENT | MASS % | 1.2 | 1.2 | 1.2 | 1.2 | 1.2 | 1.2 | 1.2 |
| COATING OF CHEMICAL SOLUTION | COATING OF CHEMICAL SOLUTION | PRESENCE/ABSENCE | PRESENCE | PRESENCE | PRESENCE | PRESENCE | PRESENCE | PRESENCE | PRESENCE |
| | COATING METHOD | | GRAVURE TRANSFER | FLEXOGRAPHIC TRANSFER | FLEXOGRAPHIC TRANSFER | FLEXOGRAPHIC TRANSFER | GRAVURE TRANSFER | FLEXOGRAPHIC TRANSFER | GRAVURE TRANSFER |
| MOISTURIZING AGENT COMPONENT | MOISTURIZING COMPONENT GLYCERIN | MASS % | 13.5 | 55.0 | 42.5 | 55.0 | 42.5 | 42.5 | 17.0 |
| | 1,3-PROPANEDIOL | MASS % | 66.7 | 20.0 | 42.5 | 20.0 | 42.5 | 42.5 | 62.9 |
| | SORBITOL | MASS % | 4.7 | 0.0 | 0.0 | 10.0 | 0.0 | 0.0 | 5.0 |
| | SOFTENING AGENT PHOSPHORIC ESTER | MASS % | 1.3 | 1.3 | 1.3 | 1.3 | 1.3 | 1.3 | 1.3 |
| | OILY COMPONENT LIQUID PARAFFIN | MASS % | 2.3 | 2.3 | 2.3 | 2.3 | 2.3 | 2.3 | 2.3 |
| | HYDROPHILIC POLYMER GELLING AGENT (GLUCOMANNAN) | MASS % | 0.5 | 0.5 | 0.5 | 0.5 | 0.5 | 0.5 | 0.5 |
| | EMULSIFYING AGENT | MASS % | 0.3 | 0.3 | 0.3 | 0.3 | 0.3 | 0.3 | 0.3 |
| | ANTISEPTIC AGENT | MASS % | 0.1 | 0.1 | 0.1 | 0.1 | 0.1 | 0.1 | 0.1 |
| | ANTIFOAMING AGENT | MASS % | 0.05 | 0.05 | 0.05 | 0.05 | 0.05 | 0.05 | 0.05 |
| | WATER (MOISTURE AMOUNT IN CHEMICAL SOLUTION) | MASS % | 10.5 | 10.5 | 10.5 | 10.5 | 10.5 | 10.5 | 10.5 |
| | TOTAL AMOUNT | MASS % | 100.0 | 90.1 | 100.0 | 100.0 | 100.0 | 100.0 | 100.0 |
| | GLYCERIN + 1,3 PROPANEDIOL (IN CHEMICAL AGENT) | MASS % | 89.6 | 83.8 | 94.9 | 83.7 | 94.9 | 94.9 | 89.3 |
| | MASS RATIO | (GLYCERIN):(1,3 PROPANEDIOL) | 1:4.94 | 1:0.36 | 1:1 | 1:0.36 | 1:1 | 1:1 | 1:3.7 |
| CHEMICAL AGENT CONTENT (ABSOLUTELY DRIED) | CHEMICAL AGENT CONTENT RATIO (INCLUDING MOISTURE, TOTAL AMOUNT OF BOTH SURFACES) | MASS % | 10.0 | 10.0 | 11.0 | 13.0 | 15.0 | 15.2 | 18.0 |
| | CHEMICAL AGENT CONTENT | g/m² | 2.1 | 2.1 | 2.3 | 2.8 | 3.3 | 3.5 | 4.2 |
| | CHEMICAL AGENT CONTENT RATIO (ABSOLUTELY DRIED) | MASS % | 9.0 | 9.0 | 9.8 | 11.6 | 13.4 | 13.6 | 16.1 |
| | 1,3-PROPANEDIOL PROPORTION IN PAPER | MASS % | 6.7 | 2.0 | 4.7 | 2.6 | 6.4 | 6.5 | 11.3 |
| PRODUCT QUALITY | BASIS WEIGHT (1P) | g/m² | 12.5 | 12.7 | 12.9 | 13.5 | 13.9 | 14.8 | 15.2 |
| | PAPER THICKNESS (2P) | μm | 129 | 136 | 139 | 128 | 134 | 144 | 147 |
| | DENSITY (2P) | g/cm³ | 0.19 | 0.19 | 0.19 | 0.21 | 0.21 | 0.21 | 0.21 |
| | DRY TENSILE STRENGTH (LONGITUDINAL DIRECTION) 2P | cN/25 mm | 249 | 278 | 299 | 234 | 208 | 266 | 190 |
| | DRY TENSILE STRENGTH (LATERAL DIRECTION) 2P | cN/25 mm | 110 | 99 | 98 | 94 | 83 | 95 | 64 |
| | WET TENSILE STRENGTH (LONGITUDINAL DIRECTION) 2P | cN/25 mm | 142 | 143 | 134 | 119 | 93 | 136 | 97 |

TABLE 2-continued

Table 2

| | | | Example 12 | Example 13 | Example 14 | Example 15 | Comparative Example 13 | Comparative Example 14 | Comparative Example 15 |
|---|---|---|---|---|---|---|---|---|---|
| | WET TENSILE STRENGTH (LATERAL DIRECTION) 2P | cN/25 mm | 50 | 45 | 48 | 45 | 48 | 45 | 40 |
| | WET TENSILE STRENGTH (LATERAL DIRECTION) 2P / DRY TENSILE STRENGTH (LATERAL DIRECTION) 2P | cN/25 mm | 0.45 | 0.45 | 0.49 | 0.48 | 0.58 | 0.47 | 0.63 |
| | SOFTNESS | cN/100 mm | 0.70 | 0.89 | 0.84 | 0.81 | 0.82 | 0.91 | 0.90 |
| | MMD (FRONT SURFACE) | 1/100 | 6.2 | 8.1 | 7.7 | 7.3 | 7.0 | 9.3 | 6.9 |
| | MOISTURE PERCENTAGE OF PRODUCT | % | 10.3 | 12.6 | 13.8 | 12.5 | 13.0 | 14.5 | 14.5 |
| ORGANOLEPTIC EVALUATION | SOFTNESS | | 3.1 | 3.1 | 3.2 | 3.6 | 3.8 | 3.8 | 4.0 |
| | SMOOTHNESS | | 3.2 | 3.3 | 3.5 | 4.0 | 4.2 | 4.2 | 4.3 |
| | SENSATION OF THICKNESS | | 2.9 | 2.9 | 2.9 | 3.2 | 3.2 | 3.2 | 3.2 |
| | MOISTNESS | | 3.0 | 3.0 | 3.3 | 3.8 | 3.8 | 4.2 | 4.3 |
| | STICKINESS | | 3.5 | 3.2 | 3.4 | 3.7 | 3.8 | 3.9 | 3.9 |
| | COMPREHENSIVE EVALUATION | | 3.1 | 3.1 | 3.3 | 3.7 | 3.9 | 4.1 | 4.2 |

| | | Example 12 | Example 13 | Example 14 | Example 15 | Comparative Example 13 | Comparative Example 14 | Comparative Example 15 |
|---|---|---|---|---|---|---|---|---|
| PAPER MAKING OF BASE PAPER | MIXING RATIO OF PULP | 30:70 | 30:70 | 30:70 | 30:70 | 30:70 | 30:70 | 30:70 |
| | CREPE RATIO | 21.0 | 21.0 | 21.0 | 21.0 | 21.0 | 21.0 | 21.0 |
| | SOFTENING AGENT | 0.6 | 0.6 | 0.6 | 0.6 | 0.6 | 0.6 | 0.6 |
| | DRY PAPER STRENGTHENING AGENT | 0.0 | 0.0 | 0.0 | 0.0 | 0.0 | 0.0 | 0.0 |
| | WET PAPER STRENGTHENING AGENT | 1.2 | 1.2 | 1.2 | 1.2 | 1.2 | 1.2 | 1.2 |
| COATING OF CHEMICAL SOLUTION | COATING METHOD | PRESENCE FLEXOGRAPHIC TRANSFER | PRESENCE FLEXOGRAPHIC TRANSFER | PRESENCE GRAVURE TRANSFER | PRESENCE GRAVURE TRANSFER | PRESENCE FLEXOGRAPHIC TRANSFER | PRESENCE GRAVURE TRANSFER | ABSENCE |
| MOISURIZING AGENT COMPONENT | MOISTURIZING COMPONENT — GLYCERIN | 42.5 | 17.0 | 13.5 | 42.5 | 42.5 | 42.5 | |
| | 1,3-PROPANEDIOL | 42.5 | 62.9 | 66.7 | 42.5 | 42.5 | 42.5 | |
| | SORBITOL | 0.0 | 5.0 | 4.7 | 0.0 | 0.0 | 0.0 | |
| | SOFTENING AGENT PHOSPHORIC ESTER | 1.3 | 1.3 | 1.3 | 1.3 | 1.3 | 1.3 | |
| | OILY COMPONENT LIQUID PARAFFIN | 2.3 | 2.3 | 2.3 | 2.3 | 2.3 | 2.3 | |
| | HYDROPHILIC POLYMER GELLING AGENT (GLUCOMANNAN) | 0.5 | 0.5 | 0.5 | 0.5 | 0.5 | 0.5 | |
| | EMULSIFYING AGENT | 0.3 | 0.3 | 0.3 | 0.3 | 0.3 | 0.3 | |
| | ANTISEPTIC AGENT | 0.1 | 0.1 | 0.1 | 0.1 | 0.1 | 0.1 | |
| | ANTIFOAMING AGENT | 0.05 | 0.05 | 0.05 | 0.05 | 0.05 | 0.05 | |
| | WATER (MOISTURE AMOUNT IN CHEMICAL SOLUTION) | 10.5 | 10.5 | 10.5 | 10.5 | 10.5 | 10.5 | |
| | TOTAL AMOUNT | 100.0 | 100.0 | 100.0 | 100.0 | 100.0 | 100.0 | |
| | GLYCERIN + 1,3 PROPANEDIOL (IN CHEMICAL AGENT) | 94.9 | 89.3 | 89.6 | 94.9 | 94.9 | 94.9 | |
| | MASS RATIO | 1:1 | 1:3.7 | 1:4.94 | 1:1 | 1:1 | 1:1 | |
| | CHEMICAL AGENT CONTENT RATIO (INCLUDING MOISTURE, TOTAL AMOUNT OF BOTH SURFACES) | 21.5 | 21.5 | 25.0 | 25.0 | 25.0 | 30.0 | |
| CHEMICAL AGENT CONTENT (ABSOLUTELY) | CHEMICAL AGENT CONTENT | 5.1 | 5.1 | 5.9 | 5.9 | 6.1 | 7.2 | |

TABLE 2-continued

Table 2

| | | | | | | | |
|---|---|---|---|---|---|---|---|
| DRIED) | CHEMICAL AGENT CONTENT RATIO (ABSOLUTELY DRIED) | 19.2 | 19.2 | 22.4 | 22.4 | 22.4 | 26.9 | 15.9 |
| PRODUCT QUALITY | 1,3-PROPANEDIOL PROPORTION IN PAPER | 9.1 | 13.5 | 16.7 | 10.6 | 10.6 | 12.8 | |
| | BASIS WEIGHT (1P) | 15.8 | 15.9 | 16.1 | 16.2 | 16.8 | 17.0 | |
| | PAPER THICKNESS (2P) | 150 | 145 | 144 | 148 | 140 | 139 | 183 |
| | DENSITY (2P) | 0.21 | 0.22 | 0.22 | 0.22 | 0.24 | 0.24 | 0.17 |
| | DRY TENSILE STRENGTH (LONGITUDINAL DIRECTION) 2P | 276 | 199 | 195 | 198 | 207 | 192 | 266 |
| | DRY TENSILE STRENGTH (LATERAL DIRECTION) 2P | 133 | 72 | 74 | 88 | 63 | 58 | 91 |
| | WET TENSILE STRENGTH (LONGITUDINAL DIRECTION) 2P | 135 | 101 | 99 | 110 | 106 | 98 | — |
| | WET TENSILE STRENGTH (LATERAL DIRECTION) 2P | 59 | 53 | 46 | 43 | 47 | 41 | 34 |
| | WET TENSILE STRENGTH (LATERAL DIRECTION) 2P/ DRY TENSILE STRENGTH (LATERAL DIRECTION) 2P | 0.44 | 0.74 | 0.62 | 0.49 | 0.75 | 0.71 | 0.37 |
| | SOFTNESS | 0.98 | 0.77 | 0.75 | 0.71 | 0.78 | 0.80 | 1.15 |
| | MMD (FRONT SURFACE) | 6.8 | 6.2 | 5.5 | 6.4 | 6.3 | 6.3 | 6.1 |
| | MOISTURE PERCENTAGE OF PRODUCT | 13.4 | 13.7 | 15.1 | 15.1 | 16.0 | 14.7 | 6.0 |
| ORGANOLEPTIC EVALUATION | SOFTNESS | 4.0 | 3.9 | 3.7 | 3.6 | 3.5 | 3.5 | 3.0 |
| | SMOOTHNESS | 4.3 | 3.9 | 3.9 | 3.8 | 3.6 | 3.6 | 3.0 |
| | SENSATION OF THICKNESS | 3.1 | 3.1 | 3.1 | 3.1 | 3.0 | 3.1 | 3.0 |
| | MOISTNESS | 4.2 | 4.3 | 3.8 | 3.6 | 3.3 | 3.1 | 3.0 |
| | STICKINESS | 3.9 | 3.8 | 3.6 | 3.4 | 3.0 | 3.0 | 3.0 |
| | COMPREHENSIVE EVALUATION | 4.2 | 4.1 | 3.7 | 3.6 | 3.4 | 3.3 | 3.0 |

Figure 2:
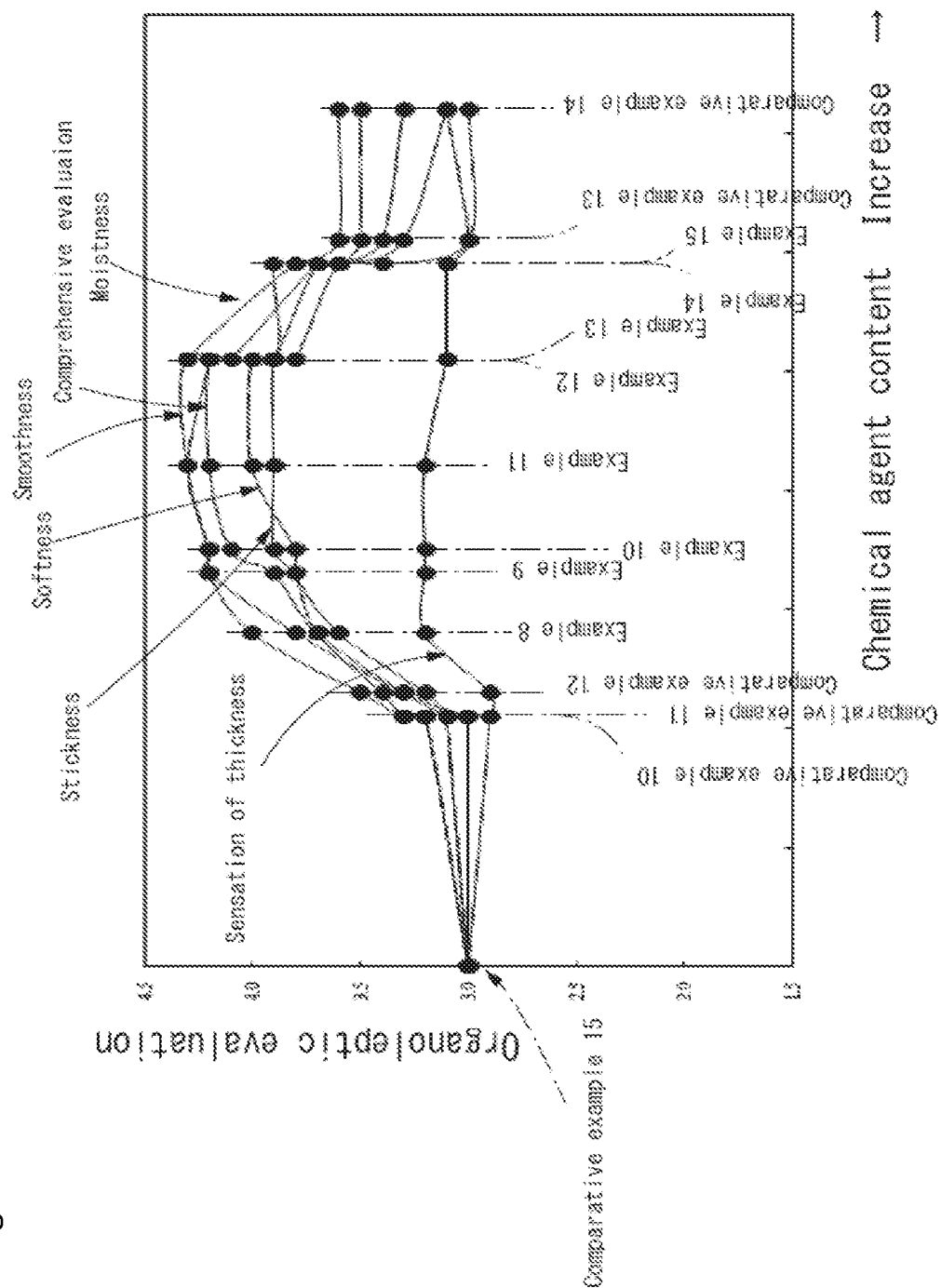
FIG. 2 is a graph illustrating results of test examples according to the embodiment.

Table 2 presents results obtained by performing tests on respective samples in which the content of the chemical agent was mainly changed. A reference sample for the organoleptic evaluation is a multipurpose one to which the chemical agent is not applied (comparative example 15). Further, the results of the organoleptic evaluation regarding examples 8 to 15 and comparative examples 10 to 15 are turned into a graph and presented in FIG. 2. As illustrated in Table 2 and FIG. 2, when the content of the chemical agent is within the range of the present invention, the results which were significantly superior to those of the reference sample were obtained regarding the respective evaluation items of "softness", "smoothness", "moistness", and "stickiness". In particular, quite significantly high evaluation results were obtained regarding "smoothness", "moistness", and "stickiness". From the above description, it can be recognized that when the content of the chemical agent is set to fall within the range of the present invention, "smoothness and moistness" are provided but "stickiness" is difficult to be sensed. Further, from the above Table 2, it can also be confirmed that when the content of the chemical agent is lower or higher than the range of the present invention, the evaluation results are not good even if the mass ratio between glycerin and 1,3-propanediol or the like is within the range of the present invention.

[SUMMARY]

From the above-described results of the respective tests, by setting the content ratio of glycerin and 1,3-propanediol in total in the chemical agent, the compounding ratio of glycerin and 1,3-propanediol in the chemical agent, and the chemical agent content to fall within the ranges of the present invention, there is provided tissue paper improving both of "moistness" and "smoothness" in particular, and capable of providing significant sensation of the "smoothness" while having the "moistness".

What is claimed is:

1. A two-ply tissue paper, wherein:
   a basis weight per one ply of said two-ply tissue paper is greater than 12.9 g/m$^2$ and less than 16.8 g/m$^2$;
   said two-ply tissue paper has a paper thickness of not less than 128 μm nor more than 150 μm; and
   said two-ply tissue paper comprises a chemical agent containing glycerin and 1,3-propanediol in a total amount of 83.7 mass % or more and having a mass ratio of glycerin to 1,3-propanediol of greater than 1:0.14 and less than 1:6.64, wherein said chemical agent is contained in said two-ply tissue paper in an amount greater than 2.3 g/m$^2$ and less than 6.1 g/m$^2$.

2. A two-ply tissue paper, wherein:
   a basis weight per one-ply of said two-ply tissue paper is not less than 13.5 g/m$^2$ nor more than 16.1 g/m$^2$;
   said two-ply tissue paper has a paper thickness of not less than 128 μm nor more than 150 μm; and
   said two-ply tissue paper comprises a chemical agent containing glycerin and 1,3-propanediol in a total amount of 83.7 mass % or more and having a mass ratio of glycerin to 1,3-propanediol of greater than 1:0.14 and less than 1:6.64, wherein said chemical agent is contained in said two-ply tissue paper in an amount greater than 2.3 g/m$^2$ and less than 6.1 g/m$^2$.

3. The two-ply tissue paper according to claim 1, wherein:
   said two-ply tissue paper has a dry tensile strength in a cross direction (CD) of greater than 63 cN/25 mm and equal to or less than 133 cN/25 mm;
   said two-ply tissue paper has a wet tensile strength in the CD of greater than 39 cN/25 mm and equal to or less than 59 cN/25 mm; and
   a ratio of the wet tensile strength in the CD to the dry tensile strength in the CD is 0.30 or more.

4. The two-ply tissue paper according to claim 2, wherein:
   said two-ply tissue paper has a dry tensile strength in a cross direction (CD) of greater than 63 cN/25 mm and equal to or less than 133 cN/25 mm;
   said two-ply tissue paper has a wet tensile strength in the CD of greater than 39 cN/25 mm and equal to or less than 59 cN/25 mm; and
   a ratio of the wet tensile strength in the CD to the dry tensile strength in the CD is 0.30 or more.

\* \* \* \* \*